March 16, 1971 R. W. PHILLIPS 3,570,228
LEAF REMOVING APPARATUS

Filed Feb. 26, 1969 3 Sheets-Sheet 1

INVENTOR.
ROY W. PHILLIPS
BY
ATTORNEY

INVENTOR.
ROY W. PHILLIPS
BY
ATTORNEY

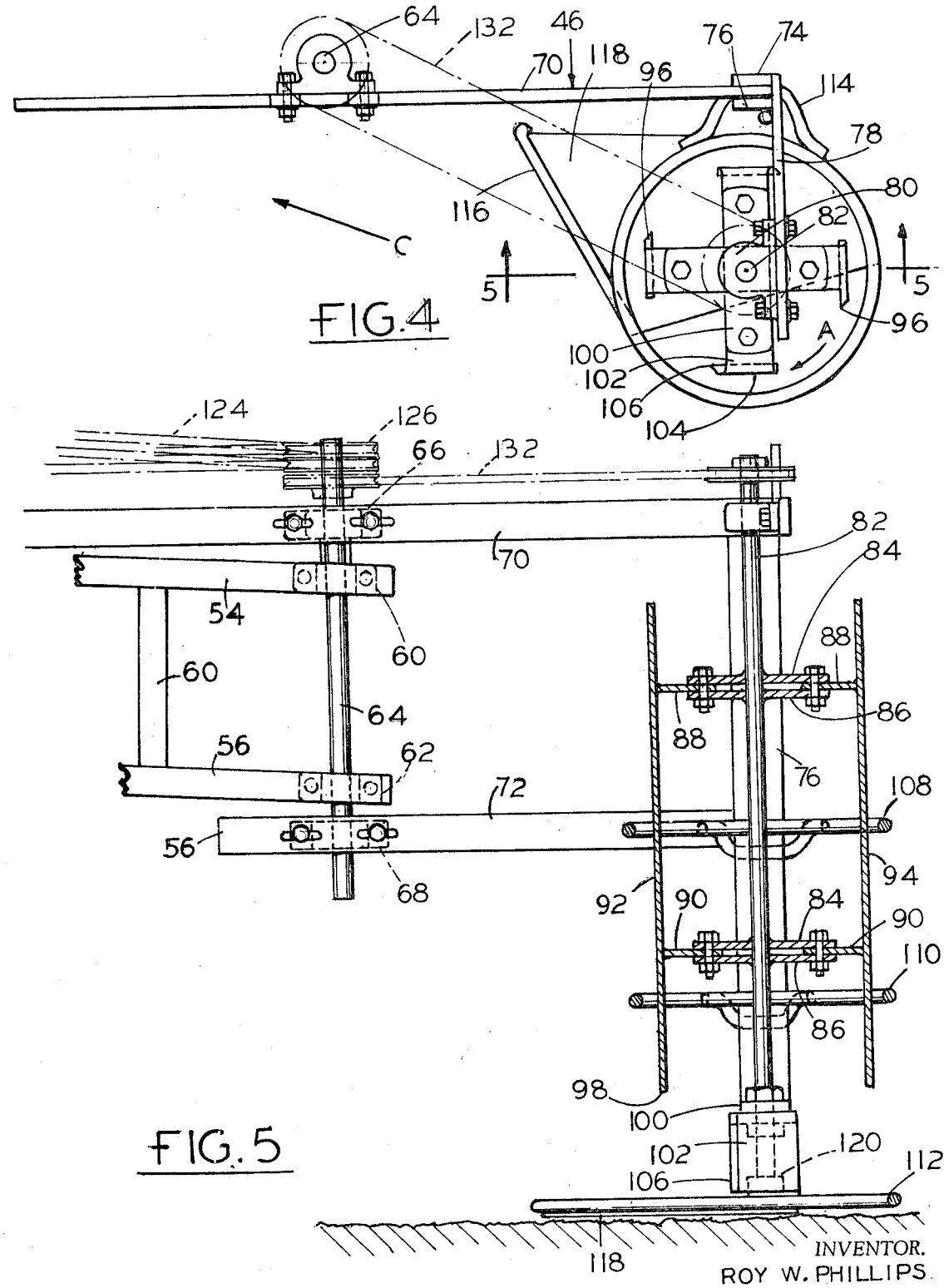

United States Patent Office 3,570,228
Patented Mar. 16, 1971

3,570,228
LEAF REMOVING APPARATUS
Roy W. Phillips, 894 Eddy Ridge Road,
Marion, N.Y. 14505
Filed Feb. 26, 1969, Ser. No. 802,482
Int. Cl. A01d 55/18
U.S. Cl. 56—234                                   1 Claim

ABSTRACT OF THE DISCLOSURE

Deleafer for Brussels sprouts plants and the like arranged in a row comprising a transverse frame disposed at a height to clear a row of plants, a pair of arms one longer than the other extending rearwardly from the frame and adapted to swing on substantially vertical axes, a vertical axis cutting assembly rotatably supported on the end of each arm and having tangentially disposed knives of a length commensurate with the height of the plants, means to reversely rotate the knives of one assembly with respect to the other assembly, circular guards for each of said assemblies for engaging and riding around a plant, while the knives cut the leaves extending therefrom, the assemblies being staggered to prevent interference between the assemblies, and being yieldingly urged toward one another.

---

This invention relates to harvesting apparatus and more particularly to leaf removing apparatus adapted for Brussels sprouts harvesting.

In harvesting Brussels sprouts, it has been the practice first to go through the field and manually knock the leaves down, breaking them off at their stems to expose the stalks with the sprouts thereon for subsequent cutting at ground level. The leaves are large, bulky, hide the sprouts, and must be disposed of, and by knocking them down, or cutting them off, as by projecting a cylindrical manual cutter of a diameter greater than the sprouts downwardly over each plant; the leaves may be severed from the plant and left on the ground. After the preliminary work of deleafing, above referred to, the individual plants with sprouts thereon may be cut as ground level, and hauled away for further processing, leaving the leaves on the ground.

The present invention is directed to tractor driven power apparatus for deleafing the plants capable of being driven along a plurality of rows of plants whereby the deleafing may be effected without delay, and without the manual labor referred to. More particularly the invention contemplates the use of vertical axis rotary cutter assemblies adapted to be brought into close proximity with the uniformly spaced stalks in a row, the cutter assemblies being adapted to move laterally to clear each stalk and the sprouts of each plant, which cutting the leaves thereof close to the sprouts of the plant. Additionally the apparatus comprises assemblies arranged in pairs so as to move along the opposite sides of the plants in a row, the cutter assemblies being staggered so as to permit the cutter assemblies of a pair to sequentially move centrally toward each individual plant before moving laterally to clear the stalk and sprouts, without the cutter assemblies of a pair interfering with each other.

The above and other features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claim.

FIG. 4 is a plan view of parts of a right hand assembly of one pair with parts removed, and FIG. 5 is a sectional view taken on the line 5—5 of FIG. 4.

Figure 1:
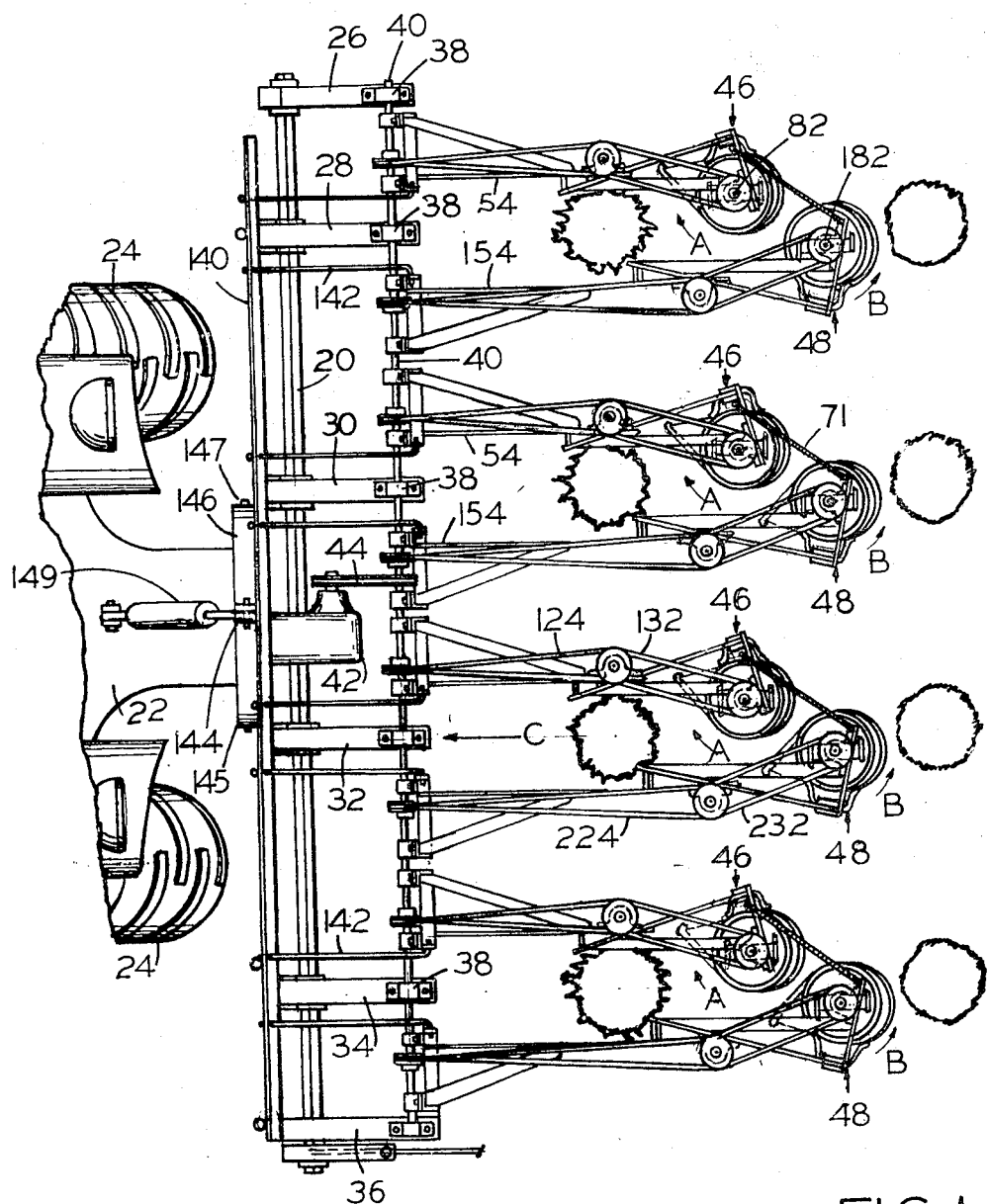
FIG. 1 is a plan view of a tractor drawn deleafer adapted for simultaneous operation along four rows of sprout plants.

Referring to FIG. 1, there is shown a frame including a rigid transverse bar 20 disposed at a height to clear Brussels sprouts plants of a height up to 24 inches, such bar being mounted on the rear of a tractor 22 having adequate clearance, and having wheels 24 spaced so as to roll between plant rows. Extending rearwardly from the bar 20, are a plurality of arms 26, 28, 30, 32, 34 and 36 having on their outer ends bearing blocks 38, in which is journalled a shaft 40. Such shaft is driven by power from the tractor as by a power take off indicated at 42, and a sprocket and chain drive 44.

Journalled on the shaft 40 are four rearwardly extending pairs of right and left frame assemblies 46 and 48 respectively, the frame assembly pairs being laterally spaced to correspond to the plant row spacing as indicated and so that each pair will be aligned along a plant row.

Each right hand assembly 46 comprises an arm extending rearwardly from spaced upright members 50 and 52, each having journal blocks 38 through which the shaft 40 extends, the arm comprising upper and lower parallel members 54 and 56 extending to the upright member 50. The members 54 and 56 ay be provided with a vertical connecting bar 60. The outer ends of the members 54 and 56 are provided with a pair of self aligning bearings 60 and 62 in which is journalled a jack shaft 64, on the upper and lower ends of which are disposed bearing blocks 66 and 68 to which are affixed horizontal swinging arms 70 and 72. Such arms are affixed to a substantially vertical support composed of spaced members 74 and 76 disposed on opposite sides of the arms 70 and 72, and extending substantially to ground level.

Extending at right angles to the upper arm 70 and at the upper end of support members 74, 76 is a bearing support leg 78 having at its outer end a bearing 80, in which is journalled the upper end of a cutter bar shaft 82. To such shaft are welded spaced opposed plates 84 and 86 upon which are swiveled the spaced radial lugs 88 and 90 of cutter bars 92 and the bars 94, having cutting edges 96 along the length. Such bars terminate at a point sufficiently above ground level as at 98 so as to avoid obstructions such as stones which might unduly curtail the cutting life of the lower ends of such bars if extended to ground level.

At approximately the level of the lower ends 98 of cutter bars 92 and 94, is a transverse plate member 100 affixed to the shaft 82. Upon the opposed ends of the plate 100 are swivelly attached radial arm portions 102 of the cutters 104, each with a cutting edge 106 extending from ground level to the approximate level of the ends 98 of the cutter bars 92 and 94. Suitable circular guard rings 108, 110 and 112 of round sectional bar are concentrically disposed about the shaft 82. Such rings ride against the sprouts of the plants and prevent the cutting edges from contact with the plant. The rings 108, 110 and 112 are secured to the support by welded loop members 114 extending between the support members 74 and 76. The lower ring 112 is provided with an inclined camming extension 116 which is reinforced by a plate 118, which extends to the center of the ring 112 to provide support for a lower bearing 120 for the shaft 82.

The cutter bar shaft 82 is driven in the direction of arrow A by a pulley and belt drive 124 from shaft 40, operating through pulleys 126 on jack shaft 64 from which the cutter bar shaft 82 is driven by the belt drive 132.

Each left hand assembly 48 is similar to the right hand assembly except reversed, and is supported on arms 154 which are longer than arms 54, so that the cutters of shaft 82 precede the cutters of shaft 182 a sufficient distance so that each may swing into the center line of a row of plants without interfering with one another. The trailing cutters mounted on shaft 182 are rotated in the direction of arrow B by the belt drives 224 and 232 from the shaft 40. To limit the extent to which the right hand and left hand cutters may swing toward each other and into the center line of the row of plants, suitable stops 55 and 155 may be affixed to the arms 54 and 154 respectively to engage the extended ends of the upper arms 70 and 170 of the right and left hand assemblies, and to resiliently urge the arms 70 and 170 to swing toward one another so as to overly the center line of the plant row, a tension spring 71 may be provided, extending between posts 73 and 173 on the legs 78 and 178 respectively.

In order to lift the assemblies to a suitable height for transport along a road, or to assist in turning around at the end of a plurality of rows, the arms 54 and 154, and members 52 and 152 are provided with upwardly extending extensions such as 51 and 151, which may act as lifting levers for the arms 54 and 154. Such lifting levers are connected to a transverse member 140 by links 142. The member 140 is fastened to the upper end 144 of a V lever 146 pivoted at its lower ends 145 and 147 upon the tractor frame, and such V lever may have its upper end pulled forward by a power cylinder 149, whereby to pull on the links 142 and lift the cutter bars from the ground.

Figure 2:
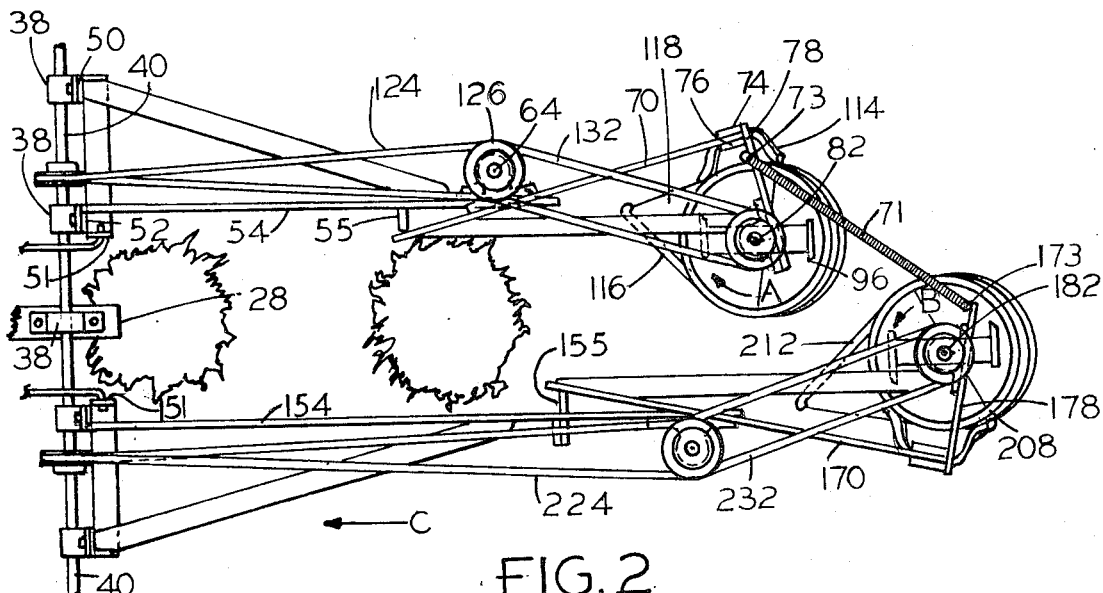
FIG. 2 is an enlarged plan view of a pair of cutter assemblies acting on one row.
Figure 3:
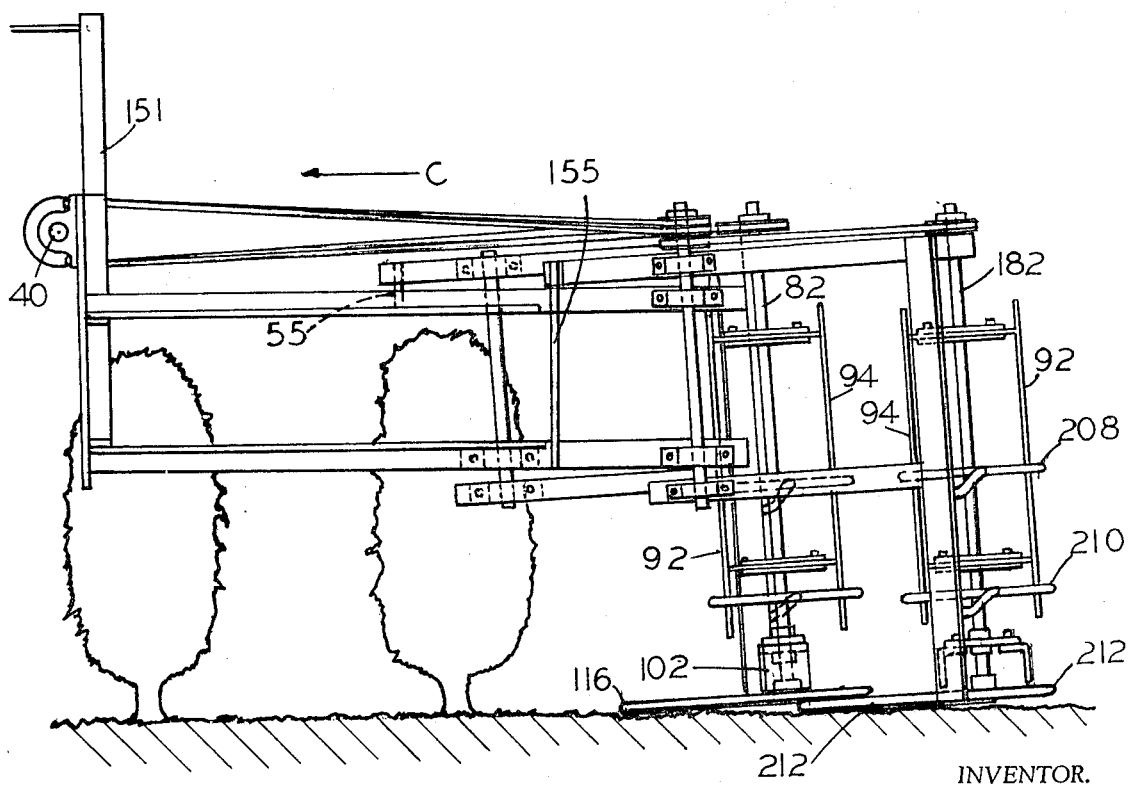
FIG. 3 is a side elevational view of a pair of assemblies as shown in FIG. 2.

The rotation of the cutter shafts 82 and 182 may be in the order of 1100 to 2200 revolutions per minute, and the radius of the cutting edges about 5½ inches, and the diameters of the circular guard rings 108, 110 and 112 about 12 inches. As the apparatus is moved over the field in the direction of arrow C the cutting knives of the right hand assembly first engage the leaves of the plant. Thereafter the camming extension 116 will engage the stalk at its base and move the cutting knives laterally while the guard rings 108 and 119 cam around the sprouts on the stalk to keep the knives sufficiently spaced to avoid the sprouts. As the right hand assembly passes around the right hand side of each plant, it reaches a point where the guard rings 108 and 110 pass beyond the plant to thereby allow the cutters to swing inwardly to its limit position so as to cut leaves extending from the plant in the direction of travel. While the right hand assembly is being spread to pass around the plant, the left hand assembly with its knives rotating oppositely is approaching the plant to cut the leaves from the left hand side, and as forward movement takes place, its camming bar 216 swings the arm 170 clockwise as seen in FIG. 2 to clear the plant and its sprouts, with the rings 208, 210 and 212 riding around the sprouts to keep the knives from plant contact while cutting the leaf stems close to the plant.

During rotation of the shafts 82 and 182, the knives, and their supporting lugs 88 and 90, the plates 102 are yieldingly held in a radial position by centrifugal force, and as such may yield to any obstruction offering substantial resistance, over and above the resistance to severing the stems of the leaves. In this manner the knives 92 and 104 are protected against unnecessary injury.

Although four pairs of cutters are shown to process four rows at a time, it will of course be apparent that the number of pairs may be varied as desired.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

What is claimed is:

1. A deleafer for Brussels sprouts plants and the like arranged in a row comprising a transverse frame disposed at a height to clear a row of plants, a pair of arms extending rearwardly from the frame and adapted to swing upon substantially vertical axes, a vertical axis cutting assembly rotatably supported on each arm including a rotatable vertical cutter shaft with a plurality of mounting plates adhered to said cutter shaft, a plurality of vertical cutter bars, commensurate with the height of the plants, tangentially positioned on said mounting plates and interconnecting said plates, means to rotate the knives of one assembly in one direction and in the other assembly in the opposite direction, circular guards for each of said assemblies adapted to engage and ride around a plant, while the knives cut the leaves extending therefrom, means for locating one assembly nearer the frame than the other to prevent inter-engagement of the knives of the assemblies, and means for yieldingly urging the assembly arms to swing toward one another.

References Cited
UNITED STATES PATENTS

| | | | |
|---|---|---|---|
| 625,688 | 5/1899 | Kepner | 56—234 |
| 3,045,413 | 7/1962 | Sheffer | 56—6X |
| 3,115,739 | 12/1963 | Thoen et al. | 56—6 |
| 3,245,211 | 4/1966 | Wegandt et al. | 56—330 |

LOUIS G. MANCENE, Primary Examiner

J. N. ESKOVITZ, Assistant Examiner

U.S. Cl. X.R.

56—6, 25.4